United States Patent
Popescu-Stanseti et al.

(10) Patent No.: US 7,808,548 B1
(45) Date of Patent: Oct. 5, 2010

(54) POWER MANAGEMENT FOR DIGITAL DEVICES

(75) Inventors: Vlad Popescu-Stanseti, San Jose, CA (US); Liusheng Liu, San Jose, CA (US); James Lam, Pleasanton, CA (US); Bruce S. Denning, Monterey, CA (US); Sterling Du, Palo Alto, CA (US)

(73) Assignee: O2Micro International Limited, Grand Cayman (KY)

( * ) Notice: Subject to any disclaimer, the term of this patent is extended or adjusted under 35 U.S.C. 154(b) by 808 days.

(21) Appl. No.: 11/026,801

(22) Filed: Dec. 30, 2004

Related U.S. Application Data

(60) Provisional application No. 60/562,374, filed on Apr. 15, 2004.

(51) Int. Cl.
*H04N 5/225* (2006.01)
(52) U.S. Cl. .................. 348/372; 348/311; 348/374
(58) Field of Classification Search ............. 348/311, 348/372, 374; 323/351; 455/127.1, 343.1–343.6; 396/301–304, 429, 277
See application file for complete search history.

(56) References Cited

U.S. PATENT DOCUMENTS

| | | | |
|---|---|---|---|
| 5,389,998 A * | 2/1995 | Dunsmore et al. .......... 396/301 |
| 5,949,160 A | 9/1999 | Anderson et al. ........... 307/140 |
| 6,016,407 A | 1/2000 | Tsukahara .................. 396/302 |
| 6,104,885 A * | 8/2000 | McIntyre et al. ............ 396/319 |
| 6,233,016 B1 * | 5/2001 | Anderson et al. ........... 348/372 |
| 6,484,041 B1 * | 11/2002 | Aho et al. .................... 455/574 |
| 7,239,349 B2 * | 7/2007 | Saito et al. ............... 348/231.7 |
| 2003/0126484 A1 * | 7/2003 | Catherwood ................ 713/320 |
| 2004/0183469 A1 * | 9/2004 | Lin et al. ..................... 315/247 |

FOREIGN PATENT DOCUMENTS

| JP | 2001045681 A | * | 2/2001 |
|---|---|---|---|
| JP | 20011166354 | | 6/2001 |
| JP | 200294873 | | 3/2002 |
| JP | 2003169291 | | 6/2003 |
| WO | 9817052 | | 4/1998 |

* cited by examiner

*Primary Examiner*—Yogesh K Aggarwal

(57) ABSTRACT

A method according to one embodiment includes coupling at least one power supply to a power bus comprised in a digital camera. The method of this embodiment may also include allocating power to at least one component of the digital camera by coupling at least one component to the power bus based on at least one power management priority rule. Of course, many alternatives, variations, and modifications are possible without departing from this embodiment.

17 Claims, 3 Drawing Sheets

POWER MANAGEMENT FOR DIGITAL DEVICES

RELATED APPLICATIONS

This application claims priority to U.S. Provisional Application Ser. No. 60/562,374 filed Apr. 15, 2004, the teachings of which are hereby incorporated by reference in their entirety.

BACKGROUND OF THE INVENTION

1. Field

This disclosure relates to power management for digital devices.

2. Background Art

Power management for digital devices is increasingly important as devices become smaller and more portable.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art. Accordingly, it is intended that the claimed subject matter be viewed broadly, and be defined only as set forth in the accompanying claims.

DETAILED DESCRIPTION

Figure 1:
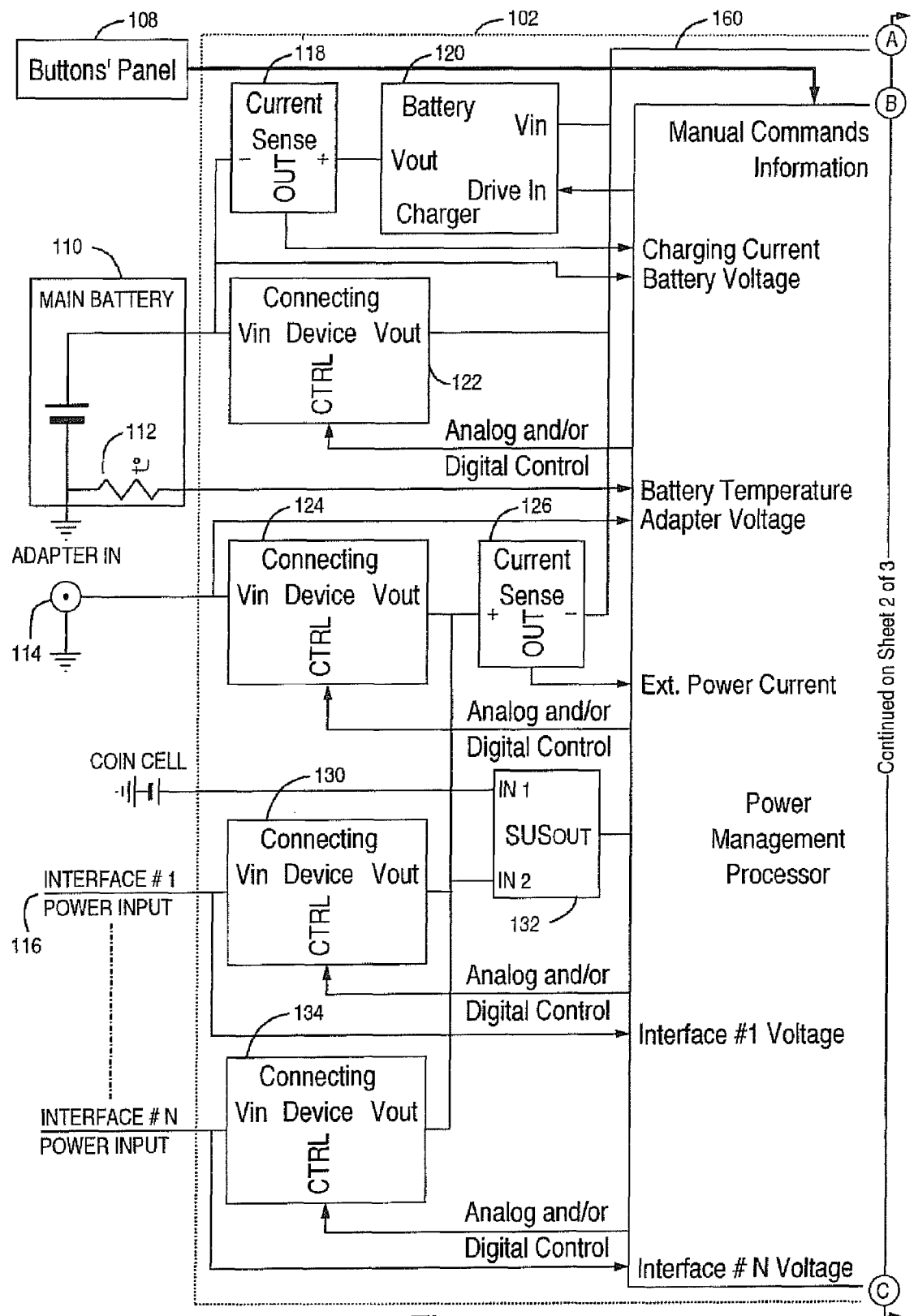
FIG. 1 is a diagram illustrating a system embodiment.
Figure 1:
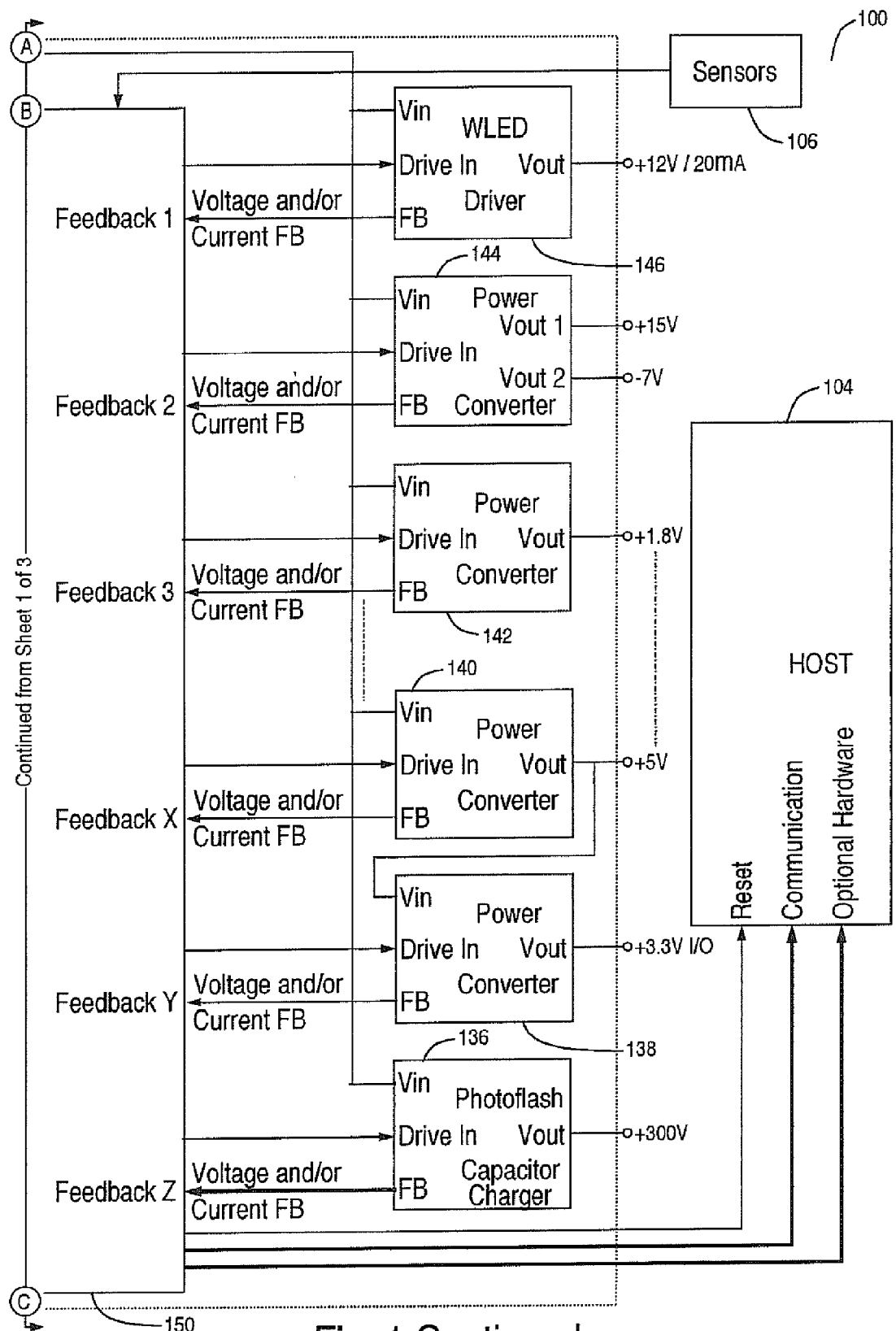

FIG. 1 illustrates a system embodiment 100 of the claimed subject matter. The system 100 may generally include a host processor 104 and a power management unit 102. The system 100 may comprise a digital device, such as a digital camera. The host processor 104 and power management unit 102 may each comprise one or more integrated circuits, and may form the core electronic components and/or core logic of a digital camera. As used in any embodiment herein, an "integrated circuit" means a semiconductor device and/or microelectronic device, such as, for example, a semiconductor integrated circuit chip. "Digital camera", as used in any embodiment herein, may comprise a still image digital camera or a video digital camera. As will be described in greater detail below, host processor 104 and power management unit 102 may each comprise circuitry. As used in any embodiment herein, "circuitry" may comprise, for example, singly or in any combination, hardwired circuitry, programmable circuitry, state machine circuitry, and/or firmware that stores instructions executed by programmable circuitry.

Although not shown in FIG. 1, the system 100 may also comprise memory which may comprise one or more of the following types of memory: semiconductor firmware memory, programmable memory, non-volatile memory, read only memory, electrically programmable memory, random access memory, flash memory, magnetic disk memory, and/or optical disk memory. Either additionally or alternatively, memory may comprise other and/or later-developed types of computer-readable memory. Machine-readable firmware program instructions may be stored in memory. As described below, these instructions may be accessed and executed by power management unit 102 and/or host processor 104 and/or other circuitry comprised in system 100, and these instructions may result in power management unit 102 and/or host processor 104 and/or other circuitry comprised in system 100 performing operations which may be attributed to these components.

The system 100 may comprise one or more sensor circuits 106 which may be capable of sensing, for example, temperature, current, and/or lens position. Power management processor 150 may be capable of receiving signals from one or more sensors 106. Also, the system embodiment may include button input circuitry 108 capable of generating one or more signals from a user interface selector (not shown). Power management processor 150 may be capable of receiving signals from one or more user activated buttons 108. In this embodiment, a power management processor 150 may be provided that may be capable of allocating power from a plurality of sources based on, for example, system power requirements and/or preprogrammed power commands, as will be detailed below. The power management processor 150 may comprise circuitry capable of generating one or more signals and interfacing to one or more circuit components of the system 100. Power management processor 150 and host processor 104 may be capable of exchanging commands and data with each other. For example, host processor 104 may be capable of communicating data with power management processor 150 regarding power requirements and/or other system aspects of one or more components comprised in a digital camera.

System 100 may also comprise a main battery power supply 110. Battery 110 may comprise one or more rechargeable batteries, as is well understood in the art. Battery 110 may also comprise a temperature sensor 112 which may be capable of generating a signal indicative of temperature conditions at or near one or more battery cells comprised in battery 110. System 100 may also include an adapter power input 114 and one or more interface power inputs 116 (depicted as Interface #1 . . . Interface #N in FIG. 1). Adapter power 114 may comprise, for example, an AC/DC adapter or other adapter which may be associated with an electronic device. Interface 116 may comprise, for example, a data interface which may include an I2C interface, FireWire interface, and/or other interface as may be known in the art. Each of the power supplies 110, 114 and 116 may be capable of providing power to one or more components comprised in the system 100. Connecting device circuitry may be coupled to one or more of the power supplies, for example, connecting device circuitry 122 coupled to power supply 110, connecting device circuitry 124 coupled to power supply 114, connecting device circuitry 130 coupled to interface power supply #1, and/or connecting device circuitry 134 coupled to interface power supply #N. One or more of the connecting device circuitry may be controlled by the power management processor 150 (using analog and/or digital control signals) to couple or decouple a selected power supply (110, 114 and/or 116) from a power rail which may be comprised in system 100.

System 100 may also comprise battery charger circuitry 120. Battery charger circuitry 120 may be capable of receiving adapter power 114 and/or power from one or more interfaces 116 and further capable of supplying charging current and/or voltage to one or more batteries comprised in the battery 110. Current sense circuitry 118 may be coupled to the output of battery charger circuitry 120 and may be capable of generating a signal indicative of battery charging current and/or voltage, as may be supplied to battery 110. Battery charger circuitry 120 may be capable of charging the battery 110 when the digital camera is ON, and power processor 150 may be capable of allocating power between the charger 120 (to charge the battery 110) and system power requirements. Another current sense circuitry 126 may be coupled to the adapter power input 114 and capable of generating a signal indicative of external adapter current, as may be provided to one or more components of system 100. Processor 150 may be capable of generating control signals to enable and/or disable operation of the battery charger circuitry 120.

System 100 may also comprise a suspend power regulator (SUS) 132. An SUS 132 may be utilized to provide a regulated output voltage to a load. SUS may be utilized when the regulated voltage level for a particular load of the electronic device is not available from a main supply voltage source and/or the supply voltage is not high enough for the particular load. SUS may comprise an LDO that can typically provide such regulated output voltage with relatively little voltage drop across it. The SUS circuitry 132 may be coupled to a power bus (connected to IN2) which may comprise power from one or more power supplies. SUS circuitry 132 may also be coupled to a coin cell battery or other back-up power source as the system of FIG. 1 comprises such back-up source. SUS circuitry may be controlled by processor 150, for example, to select SUS circuitry 132 input power.

System 100 may also comprise power converter circuitry, as may be embodied by one or more power converter circuits 138, 140, 142 and/or 144. Power converter circuitry 138, 140, 142 and/or 144 may be capable of generating a desired power output, for example, as may be required by one or more components of a digital camera. Power converter circuitry 138, 140, 142 and/or 144 may also be capable of generating a voltage and/or current feedback signal indicative of the voltage and/or current being supplied by the power converter circuitry. Such feedback signals may be communicated to power management processor 150.

System 100 may also comprise LED driver circuitry 146 capable of supplying power to one or more white LEDs for lighting an LCD panel (not shown) which may be included with a digital camera. The LED driver circuitry 146 may also be capable of generating voltage and/or current feedback information to processor 150. Processor 150 may be capable of generating a control signal to LED driver circuitry 146 to control the amount of power delivered to an LED, which may operate to control the brightness and/or contrast of the LCD panel. The system 100 may also comprise photoflash capacitor charger circuitry 136 which may be capable of charging a photoflash capacitor (not shown) to enable operation of a flash which may be included with a digital camera. The photoflash capacitor charger circuitry 136 may also be capable of generating voltage and/or current feedback information to processor 150. Processor 150 may be capable of generating a control signal to photoflash capacitor charger circuitry 136 to control the amount of power delivered by the photoflash capacitor charger circuitry 136.

As stated previously, in this embodiment, power management processor 150 may be capable of allocating power to one or more components depicted in FIG. 1. For example, power management processor 150 may be capable of allocating power to one or more components depicted in FIG. 1 based on available power from the battery 110, the adapter 114 and/or one or more interface power supplies 116. Power management processor 150 may execute instructions to manage power to one or more components based on, for example, a preprogrammed and/or user-definable priority. Power management processor may be capable of controlling one or more components 136, 138, 140, 142, 144 and/or 146 and/or other components to enable and/or disable these components based on a preprogrammed and/or user-definable priority. Accordingly, and using feedback information as may be supplied by one or more power supplies as set forth above, power management processor 150 may be capable of monitoring power availability from one or more power supplies and allocating power to one or more components based on available power, preprogrammed priority and/or user-defined priority of power usage in the system 100.

Figure 2:
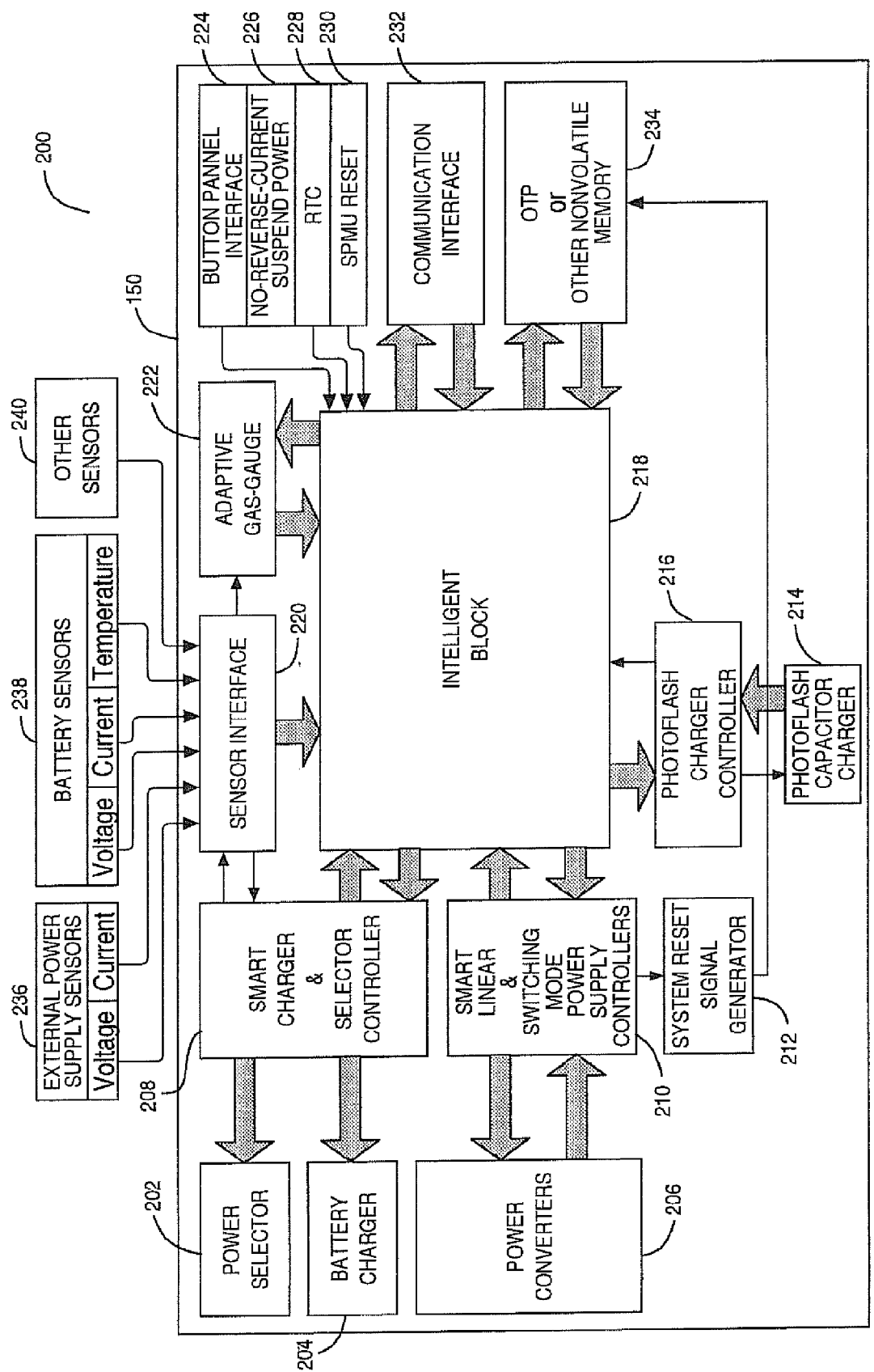
FIG. 2 is a block diagram illustrating the internal structure of a power management processor according to one embodiment.

FIG. 2 illustrates an exemplary power management processor 150 according to one embodiment. Power management processor 150 may comprise core logic circuitry 218 which may be capable of performing one or more operations described herein associated with the processor 150. Memory 234 may comprise instructions and core logic circuitry 218 may be capable of executing instructions stored in memory 234. For example power allocation instructions, as described herein, may be stored in memory 234. Core processor 218 may be capable of exchanging commands and data with the core components of a digital camera.

The power management processor 150 may also comprise communication interface circuitry 232. Core processor 218 may be capable of exchanging commands and data with the core components of a digital camera via communications interface circuitry 232. Additionally, core processor 218 may utilize serial communication interface 232 to obtain information and commands from the system and use them to change the functional characteristics (voltage, current, timing, etc.) of one or more power supplies. The serial interface may also by used in IC testing process to increase the speed and the testability.

Processor 150 may also comprise selector circuitry 202 that selects the system power supply out of two or more internal and/or external power sources, including different interfaces that may provide power. Processor 150 may be capable of managing the priorities and the restrictions associated to these power supplies while assuring the system power integrity. The restrictions associated to the external power supplies could be, but not limited to, maximum allowed current, minimum and/or maximum voltage, the necessity of an explicitly approval of use, etc.

If power is being provided by an interface, selector circuitry 202 may be capable of detecting the interface connection presence, waiting for hand-shake and usage approval if necessary, and connecting the interface power to the system's power rail. The selector 202 may be capable of limiting the current sunk from the interface at a specified value, and may also be capable of protecting the interface connection against inrush and reverse current and over-current. In order to fulfill the protection requirements and to assure the system power integrity and the battery protection, the selector circuitry may be capable of performing "make-before-break" (MBB) operations in the case of low battery voltage, and/or "break-before-make" (BBM) operations in the case of high battery voltage. After the interface power has been connected to the system, the selector 202 may be capable of protecting the system against over-current by switching back to the battery power if a current limit is exceeded.

Processor 150 may also comprise a switching mode battery charger circuitry 204. The battery charger may comprise circuitry that supplies a consistent fast charge of the battery with very low dissipation. The charger may be capable of automatically tuning its charging characteristics to the battery status. Thus, battery charger may be capable of a low pre-charge current for deeply discharged batteries, a fast, constant current (CC) charge for a normal discharged battery, followed by a constant voltage (CV) top-off charge. The charger 204 may terminate the charging when the battery is full by monitoring the charging current in CV mode.

The charger circuitry 204 may be capable of a high level of battery protection by limiting very accurately the charging terminal voltage, the charging time or maximum electrical charge detected by the adaptive battery gas-gauge. Battery temperature may also be monitored and the charging stopped if this temperature is out of the safe range. The charger may also include short-circuit protection circuitry.

A Suspend power source (SUS) may be capable of using any of internal and/or external power sources, including a coin-cell battery, if available. SUS may comprise no-reverse-current-circuitry (NRCC) to condition the power. NRCC may comprise a high efficiency voltage boost converter, which works only when needed, and/or a no-reverse-current LDO based on one or more of the following: Sensing the LDO's output current, Sensing the voltage difference between input and output, Using a built-in reverse current blocking switch, and/or Using a reversible serial device for regulation, MOS or Bipolar technology. No-reverse-current LDO may be capable of saving coin cell energy while any of the other power supplies is not available, blocking the reverse current to the main power rail, and preserving the charge status of the coin cell. Further, no-reverse-current LDO circuitry may also be capable of controllably recharging the coin cell when one or more power supplies are available.

Button panel interface circuitry 224 may be provided to switch the system power ON and OFF and/or takes other manual user commands. When the power is switched from ON to OFF, logic 218 may communicate beforehand with the host system in order to prevent inadequate power-off operation that may cause data loss.

The processor 150 may also comprise one or more switching mode power supplies (SMPS) and/or linear regulators 210 which may be capable of conditioning the power available on one or more system power rails, and may provide the appropriate voltages and/or currents to components of the system. SMPSs 210 may comprise, for example, buck converters, boost converters, buck-boost converters, flyback converters, Cuk basic and/or modified converters, SEPIC converters, etc., having one or multiple output voltages. Circuitry 210 may regulate the output voltage or current to correspond to the system load requirements. Circuitry 210 may also comprise controller circuitry which may control the output power, via for example, by controlling the ON/OFF status, voltage, current, duty cycle, etc. Logic 218 may control circuitry 210 to dynamically allocate the input available power on a time or priority base, as may be programmed and/or user-defined. The output power parameters may be controlled by the logic 218 based on the information it receives from the system and/or using external hardware signals. These signals may come from the system or from sensors, including, but not limited to voltage, current, and temperature sensors, etc.

Thus, the power management for digital devices according to the present disclosure may have several advantages over conventional digital devices. For example, logic circuitry 218 may provide real time adaptive optimization of power consumption, taking into consideration the system power requirements, the priorities as programmed, the available power, and/or any restrictions on power usage. Charger circuitry 208 may be capable of performing battery charging operations, even when the system is on. External power (as may be provided by an adapter and/or interface power) may be allocated with priority to the system, while the remaining power may be allocated to the charger circuitry 208.

When necessary, logic circuitry 218 may limit and/or prioritize the power for the low priority system blocks, as may be defined. Therefore, logic circuitry 218 may avoid current surge, excessive battery voltage drop, and system shut down caused by these events. For example, when the logic circuitry 218 determines that the battery voltage is too low to support a power converter consumption simultaneously with the photoflash capacitor charging at full speed, it may reduce the photoflash power by increasing the charging time, or may simply stop it until the operation requiring high power has elapsed.

Also, logic circuitry 218 may be capable of managing power from multiple sources, including power provided by one or more interfaces. Logic circuitry may comprise detection circuitry to detect the presence of an interface connection, which may comprise negotiation circuitry to enable handshaking protocols and/or speed negation with the interface. Logic circuitry may be capable of monitoring available power and communicating with the system, and obtaining information from the system for appropriate power allocation. Logic circuitry is able to manage the priorities and the restrictions associated to interface power supplies while assuring the system power integrity.

Logic 218 may also be capable of correlating the working frequencies of the different SMPS circuits to minimize the spectral power density over a large bandwidth and the noise. While correlating the SMPS working frequencies, logic 218 can be programmed to take into consideration the optimum range for each converter. Thus, the operation can be performed without affecting the individual efficiency.

The logic 218 may use available information to monitor, for example, temperature, current, and/or voltage, to enable protection of system components. Also, logic has available direct battery current information and an accurate reference voltage, even when the power rail has a very low voltage. The processor 150 may also comprise battery gas-gauge circuitry 222. Battery gas gauge circuitry 222 may provide the logic 218 and the charger 208 with battery capacity information used in the power management and for battery protection while charging.

Those skilled in the art may recognize numerous modifications, alterations or enhancements to one or more of the embodiments described herein. The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An apparatus, comprising:
   a programmable memory for storing a plurality of instructions representing a predetermined power management priority rule;
   a core processor coupled to said programmable memory for monitoring an amount of power available from a plurality of power supplies and for monitoring an amount of power being supplied to a plurality of power converter components that generate power outputs, said core processor also for executing said plurality of instructions from said programmable memory;
   a selector circuit coupled to said core processor for receiving monitoring information from said core processor, said selector circuit also for selecting a power supply of said plurality of power supplies according to said predetermined power management priority rule and based on said amount of power being supplied to said power converter components, and for limiting a current sunk from said power supply to a specified level; and a control circuit coupled to said core processor for receiving monitoring information from said core processor, said control circuit also for allocating power to a power converter component of said plurality of power converter components based on said amount of power available from said power supplies.

2. The apparatus of claim 1, wherein said power supplies are selected from the group consisting of a battery power supply, an adapter power supply, an interface power supply and a coin cell power supply.

3. The apparatus of claim 1, wherein said core processor is further capable of receiving feedback information from a system load, and said predetermined power management priority rule comprises allocating power to said system load based on, at least in part, said feedback information.

4. The apparatus of claim 1, further comprising:
a battery charger circuitry capable of charging a rechargeable battery, wherein said core processor is further capable of allocating at least part of said power supply to said battery charger circuitry to charge said rechargeable battery.

5. The apparatus of claim 1, wherein said core processor is capable of managing priorities in allocating power to components of a digital camera.

6. The apparatus of claim 1, wherein said selector circuit is capable of performing "make-before-break" operations in the case of low battery voltage when supplying power to said system load.

7. A method, comprising:
storing a plurality of instructions representing a predetermined power management priority rule in a programmable memory;
monitoring an amount of power available from a plurality of power supplies;
monitoring an amount of power being supplied to a plurality of power converter components that generate power outputs that consume available power;
executing said plurality of instructions from said programmable memory;
selecting a power supply from said plurality of power supplies according to said predetermined power management priority rule and based on said amount of power being supplied to said power converter components;
allocating power among said power converter components based on said amount of power available from said power supplies; and
limiting a current sink from said power supply to a specified level.

8. The method of claim 7, further comprising:
receiving feedback information from a system load; and
allocating power to said system load based on, at least in part, said feedback information.

9. The method of claim 7, further comprising:
allocating at least part of said power supply to charge at least one rechargeable battery.

10. The method of claim 7, further comprising:
managing priorities in allocating power to components of a digital camera.

11. The method of claim 8, further comprising:
performing "break-before-make" operations in the case of high battery voltage when supplying power to said system load.

12. A camera comprising a power management processor, said power management processor comprising:
capacitor charger circuitry for charging a photoflash capacitor to enable a flash, and for generating a feedback signal;
a programmable memory for storing a plurality of instructions representing a predetermined power management priority rule;
a core processor coupled to said capacitor charger circuitry and said programmable memory for executing said plurality of instructions from said programmable memory; and
a selector circuit coupled to said core processor for selecting a power supply of a plurality of power supplies; wherein said power management processor is operable for receiving monitoring information from said core processor and for allocating power to a power converter component of a plurality of power converter components based on an amount of voltage available from said plurality of power supplies; said power management processor also operable for monitoring said amount of voltage available from said plurality of power supplies and for monitoring an amount of current being supplied to said plurality of power converter components that generate power outputs, for selecting a power supply of said plurality of power supplies according to said predetermined power management priority rule and based on said amount of current being supplied to said power converter components, and for limiting a current sunk from said power supply to a specified level.

13. The camera of claim 12, wherein said power supplies are selected from the group consisting of a battery power supply, an adapter power supply, an interface power supply and a coin cell power supply.

14. The camera of claim 12, wherein said power management processor is further operable for receiving feedback information from a power converter component of said plurality of power converter components, and said predetermined power management priority rule comprises allocating power to said power converter component based on, at least in part, said feedback information.

15. The camera of claim 12, further comprising:
a battery charger circuitry capable of charging a rechargeable battery, wherein said power management processor is further capable of allocating at least part of said power supply to said battery charger circuitry to charge said rechargeable battery.

16. The camera of claim 12, wherein said camera is selected from a group consisting of a still image digital camera and a video digital camera.

17. The camera of claim 12, wherein said power management processor is capable of managing priorities in allocating power to components of said camera.

* * * * *